3,008,354
SPEED CHANGER
Hargus Watts, State College, Pa., and Foster B. Stulen, Boonton, N.J., assignors to Curtiss-Wright Corporation, a corporation of Delaware
Filed Jan. 15, 1960, Ser. No. 2,683
8 Claims. (Cl. 74—798)

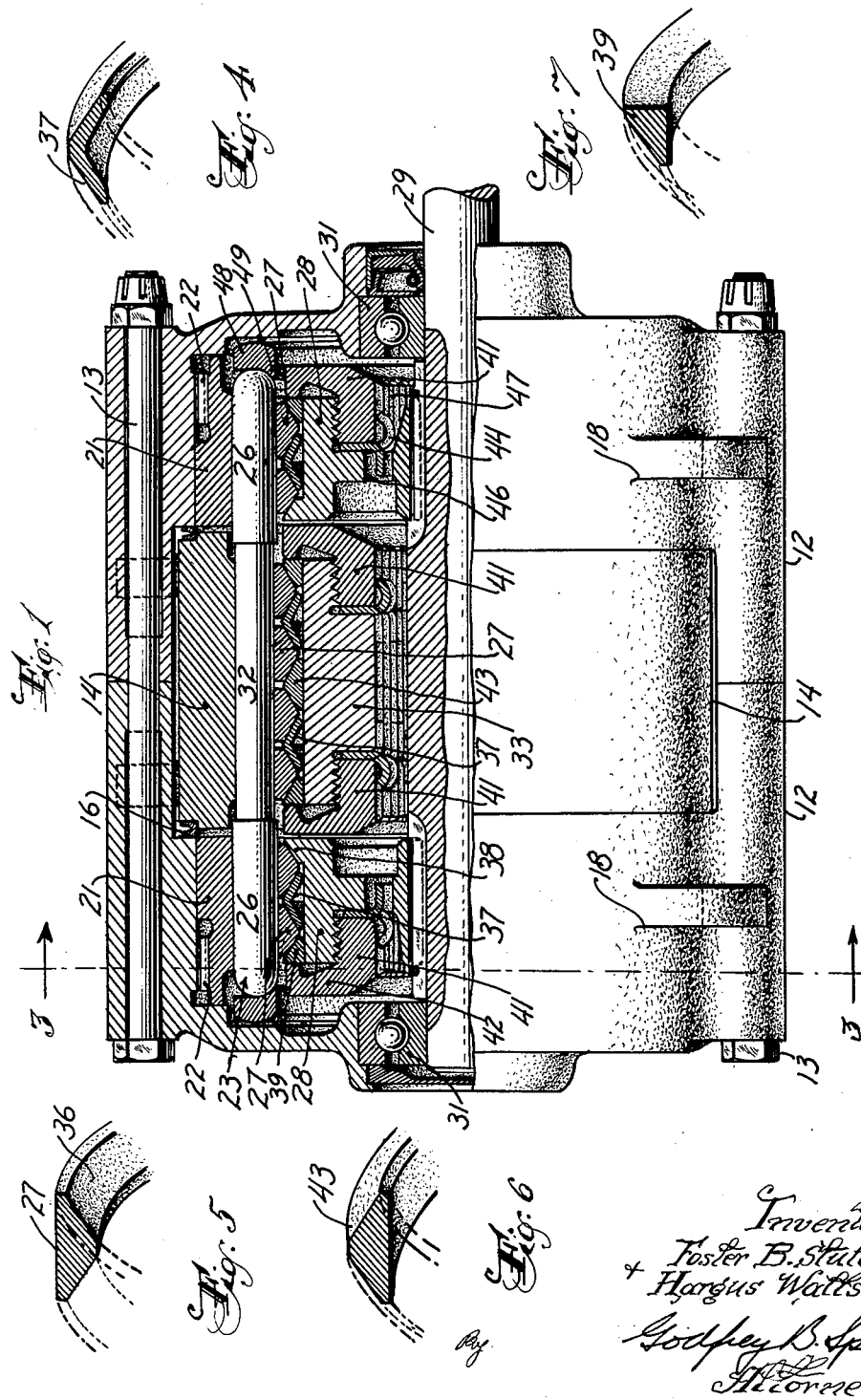

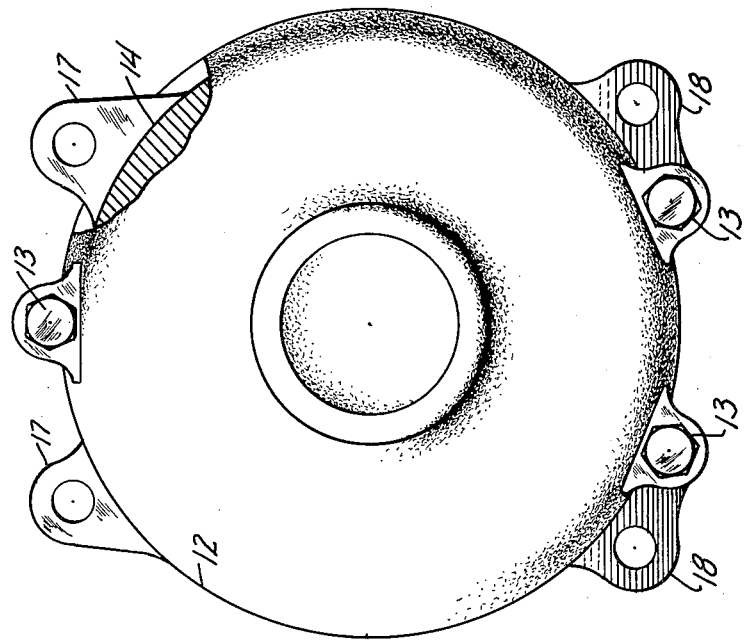
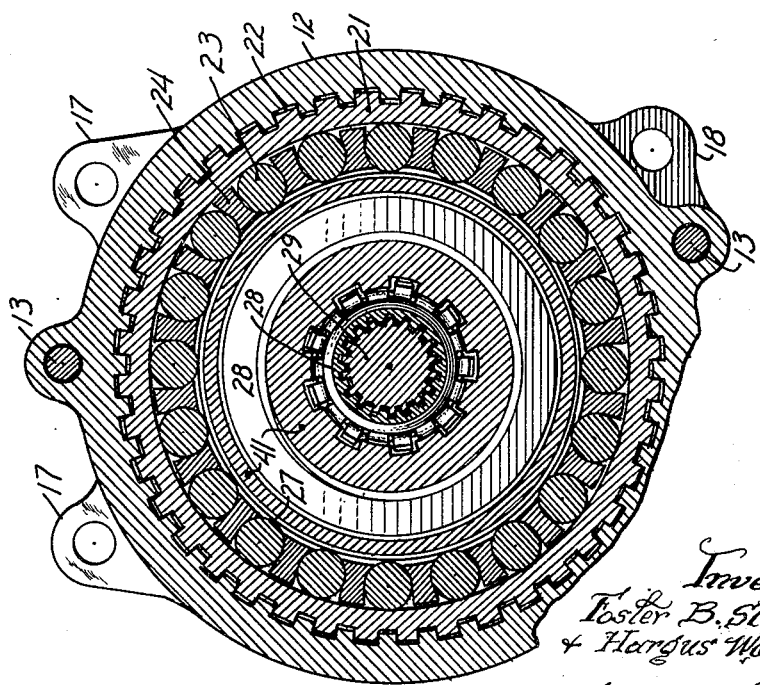

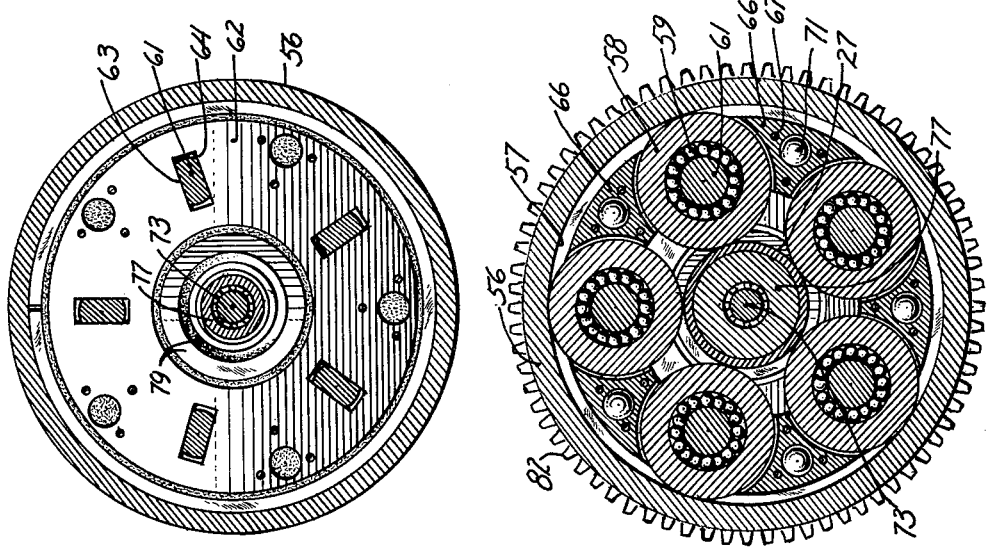
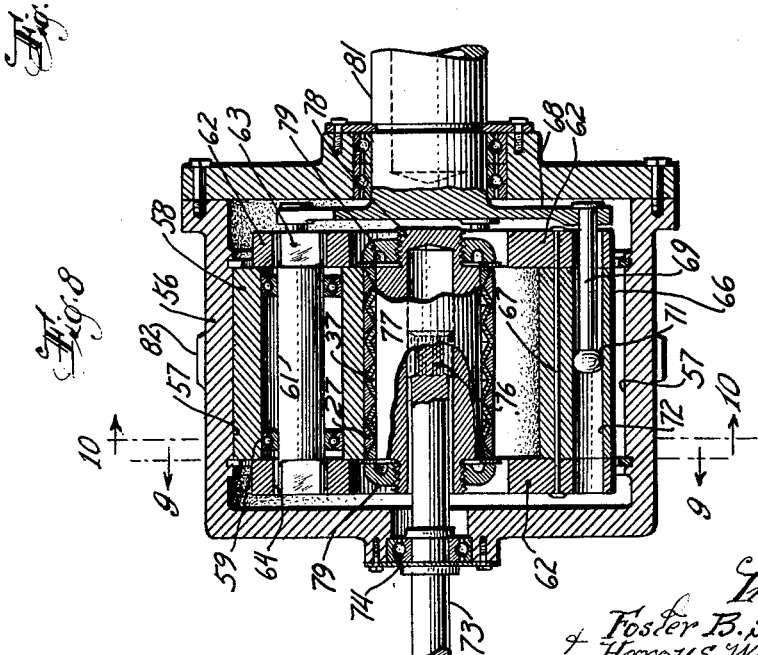

This invention relates to mechanisms for changing the rotation of a shaft system or the like from one speed to another, and comprises in general a planetary type of transmission using rollers in rolling traction engagement with race members.

In the art there are a considerable variety of planetary transmissions and speed changers utilizing gearing and also utilizing rolling traction. In the present invention arrangements for rolling traction are provided whereby the force or pressure necessary to enable transmission of significant amounts of power is secured by radial loading of the elements relative to one another, to any desired degree which may be necessary to transmit power without slipping of the roller elements.

An object of the invention is to provide a roller and race type of transmission capable of efficient transmission of power while introducing a speed change between the input and output of the mechanism.

A further object is to provide a roller transmission unit capable of a wide range of speed change ratios with only minor modification of the parts. In this connection any one embodiment of the present transmission is a fixed ratio device, rather than a continuously variable speed changer.

A further object of the invention is to provide effective arrangements for loading the rolling elements, with respect to one another, to apply the necessary forces on the mechanism for transmission of power at high torque.

A further object is to afford adjustable loading means so that the loading pressures are capable of being regulated in accordance with the torque to be transmitted.

Still another object is to provide different configurations for a roller type of transmission so that, by judicious design modifications within the scope of the invention, the utility of the mechanism may be broadened.

The annexed drawings disclose exemplary arrangements for the roller transmission of this invention and are not to be construed as limiting the scope of the invention. In these drawings:

FIG. 1 is a side elevation of one arrangement for the invention, half of the figure being a longitudinal section;

FIG. 2 is an end elevation of the arrangement of FIG. 1, partly in section;

FIG. 3 is a section on the line 3—3 of FIG. 1;

FIGS. 4–7 are fragmentary perspective views, partly in section, of the loading rings of the invention;

FIG. 8 is a longitudinal section through an alternative arrangement;

FIG. 9 is a section on the line 9—9 of FIG. 8 and

FIG. 10 is a section on the line 10—10 of FIG. 8.

Referring first to FIGS. 1–7, we provide a housing structure comprising two substantially similar end housings 12 secured to one another, through suitable openings in the housings, by bolts 13. Mid-portions of the overall housing are cut away to accept an annular member 14 sealed with respect to the housings as at 16 and rotatable relative thereto. The member 14 is provided with lugs 17 to which a load may be attached, and the housings 12 are supplied with lugs 18 for attachment to a suitable supporting structure. With this construction, the member 14 is capable of limited angular movement relative to the housings 12. However, should it be desirable to have the member 14 rotate continuously in one direction or the other, the lugs 17 may be omitted and a suitable power takeoff, such as gearing, can be adapted in the system so that the member 14 may continuously drive an external device.

The ends of the housings 12 contain annular races 21 secured from rotation in the housings as by spline connections 22. The member 14 constitutes an annular race whose inside diameter is different from the inside diameter of the races 21. Across all three races, a plurality of planetary roller elements 23 are disposed, these rollers being plural in number and being arranged around and within the races as shown in FIG. 3. Preferably, spacers 24 are disposed between adjacent rollers so that as the rollers rotate they do not crowd upon one another, but rather rub against the spacers which are preferably made of a low friction material such as nylon, Teflon or an appropriate metal. The ends 26 of the roller elements 23, where they engage the races 21 are different in diameter than the central portion 32 engaging the race 14. The roller ends may be smaller or larger than the central portions, the inside diameter of the races 21 being correspondingly smaller or larger than the inside diameter of the race 14.

Suitable means are provided to force the rollers outwardly into rolling traction engagement with the races 21. Also, means are provided to drive the rollers by rolling traction. To this end, the end portions 26 of the rollers are engaged by rings 27, cylindrical on their outer surfaces secured by other rings to be described to rotate with driving annuli 28 which are splined to a relatively high-speed input shaft 29. This shaft is piloted in the housings 12 by bearings 31. As the shaft 29 rotates, the members 28 and rings 27 rotate with it and the roller portions 26 are rotated both on their own axes and about the axis of the shaft 29 due to their traction engagement with the races 21.

Since the central portion 32 of the roller elements 23 is different in diameter from the end portions 26, these central portions 32, due to their traction with the race 14, will rotate the race 14 at a specific ratio depending upon the relative diameters of the elements of the system.

Since the roller elements 23 are subject to deflection, due to torque and due to the traction loading, it is desirable to make them as stiff as possible and also to load them radially outwardly so that all portions of the roller elements will be held in firm engagement with the races 14 and 21. To this end, a freely rotatable central annulus 33 is disposed within the central portions 32 of the roller elements, this annulus being furnished with different sized rings 27. These rings, as shown in FIG. 5, are cylindrical on their outer runs and are oppositely coned on their inner runs as at 36.

Within these rings are disposed spring rings 37 shown in detail in FIG. 4 wherein the outer runs are conical and wherein the inner runs may be concave. Further, these rings 37 may be split somewhere along their circumference. Referring to the driving annuli 28, one end is furnished with a conical seat 38 against which a slant surface 36 of a ring 27 is engaged. An outer conical run of a ring 37 engages the other slant face 36 of ring 27. Then, a slant outer face of ring 37 engages the slant inner face of another ring 27. Then, the other slant face of this last ring 27 is engaged by a solid conical ring 39 shown in FIG. 7. All of the rings are then crowded together axially by an internal nut 41 screwed into the member 28. By the camming action of the sloped surfaces of the rings, the outer surfaces of the rings 27 are forced radially outwardly to engage the roller portions 26 with any desired degree of force depending upon the tightness of the nut 41. The end of this nut at 42 is formed as a flange having the characteristics of an elastic belleville washer, giving the effect of a stiff spring loading on the rings.

Embracing the annulus 33 are rings like those described, and nuts 41 at the ends of this annulus enforce axial compression of the ring series with consequent creation of radial force against the mid-portions 32 of the rollers 23 to hold them in rolling traction against the race 14. If desired, a central solid externally conical ring 43 may be assembled in this ring array, such a ring being shown in FIG. 6.

The nuts 41, after they are set up to exert the desired amount of radial force, may be locked in place by tab washers 44 whose tabs are bent back and forth as shown to engage openings 46 in the members 28 and to engage serrations 47 formed in the bores of the nuts 41.

It is considered to be within the scope of the invention to modify the radial loading system so that the axial force exerted on the loading rings may be varied in accordance with the torque transmitted by the mechanism, instead of having the loading fixed as would result from the setting of the nuts 41.

It is also feasible to arrange the loading ring externally around the roller elements 23 instead of internally as shown, whereupon the rolling traction of the elements 23 would be exerted directly upon solid internal race elements and through the loading rings on the external race elements. In the configuration shown, however, the loading rings on the inside of the system are preferable since maximum tangential traction and torque is exerted between the roller portions and the external races 14 and 21.

For axial constraint of the rollers, to hold them properly centered in the system, end thrust rings 48 may be provided, these rings engaging the hemispherical ends of the roller elements 23, the thrust rings being held coaxial with the system by curved or conical portions 49 which embrace portions of the roller ends.

The ratio of a mechanism, such as that shown, is established by the difference in diameter between the races 14 and 21 and by the diameter relationship of the driving annuli 28 and the roller portions 26. An inversion of the driving arrangement is within the scope of the invention, wherein the annulus 33 may be driven from shaft 29 and where the annuli 28 become floating. This is considered merely to be a matter of design choice.

In the mechanism above described, there is balanced radial loading on the rollers 23 since equal driving force is applied to the ends of the rollers and the driven force is derived from the central portions thereof. This arrangement tends to prevent skewing of the rollers which would jeopardize efficient operation of the system, would modify the unit loading of the rollers, and might decrease the efficiency of the mechanism.

It has been established that the rolling traction in a mechanism of this sort is capable of transmitting large torques with loading pressures which are well within the permissible contact stresses between the rollers and races. For example, hardened steel rollers and races of ball bearing quality, with surface finishes and dimensional tolerances of the same sort, are recommended for this type of mechanism. A mechanism of the type and general size of that shown in the patent drawings should be capable of transmitting roughly fifteen thousand inch pounds of torque. The torque capacity of the mechanism increases roughly as the cube of its linear dimensions so that, by enlarging the whole assembly, much greater torque capacity may be attained.

FIGS. 8 and 9 show an alternative arrangement of a speed reducer mechanism which uses essentially the same principles as those already mentioned. Where the arrangement of FIG. 1 is analogous to a compound epicyclic mechanism, FIG. 8 shows a simple epicyclic planetary system. Here, an external cylinder housing 56 is interiorly formed as a cylindrical raceway 57. This raceway 57 is engaged by a plurality of rollers 58 journalled at 59 on arbors 61 whose ends are guided in end plates 62. For guidance purposes, the ends of the arbors are flattened as at 63 and are fitted to oblong slots 64 in the plates 62. This allows the arbors to move radially inwardly and outwardly a limited amount in the plates. The plates and arbors rotate together about the central axis of the system. The plates 62 are secured to one another by struts 66 as by bolts or rivets 67 so that these elements form a rigid cage. A drive connection is established between the cage and a separate spider 68 by pins 69 secured to the spider, the pins having ball ends 71 engaging the surfaces of bores 72 formed in the struts 66. Preferably, each ball 71 engages its strut 66 midway between the end plates 62.

Coaxial with the housing 56 is a shaft 73, piloted therein on a bearing 74. The inner end of this shaft is drivably connected as by splines 76 to the mid-portion of a cylindrical member 77. The central portion of this member is a smooth cylinder and the end portions are formed with screw threads 78. Arranged over the smooth cylindrical portion of the member 77 are alternate external rings 27 and internal rings 37, these rings being like those previously described in connection with FIG. 1 and shown in enlarged form in FIGS. 5 and 4. These rings are jammed together in an axial direction by nuts 79 engaging threads 78 so that the rings 27 are forced radially outward into firm engagement with the planetary rollers 58. The characteristics of the nuts 79 are preferably like those of the nuts 41 shown in FIG. 1 so that they operate as very stiff springs to enable the proper loading of the rings 27 against the rollers 58 and of the rollers 58 against the raceway 57.

Upon rotation of the shaft 73 the rings 27, through rolling traction, cause rotation of the rollers 58 on their own axes, causing them to planetize about the raceway 57. The rollers 58 impart their planetizing motion to the arbors 61 and thence to the plates 62 and the spider 68 mounted upon an output shaft 81 carried in bearings in the housing 56. As just described, the housing 56 would be anchored against rotation through splines or teeth 82. However, the naming of element 73 as an input member, 81 as an output member and 56 as a stationary or reaction member is merely for convenience in explaining the system. As in any planetary system, any one of the three primary members may be stationary, driving or driven, according to the desired speed relationships of these members in the environment with which they are used.

In the system of FIG. 8, arrangements are made so that the loading of the several members is balanced to avoid or minimize skewing of the rollers relative to the race elements. While this arrangement is preferable it is not wholly essential if the system is to be very lightly loaded in respect to its torque transmission capability.

It will be clear to those skilled in the art that various changes and modifications may be made in the structure shown and described without departing from the spirit and scope of the invention as set out in the appended claims.

We claim:

1. A mechanism comprising a first outer annular race and a first inner exteriorly cylindrical race embraced thereby, said races having different race surface diameters to form a first annular space therebetween; a second outer annular race and a second inner exteriorly cylindrical race embraced thereby, all said races being coaxial, said second races having different race surface diameters to form a second annular space therebetween, said two annular spaces having different internal and external bounds as established by diameter differences between the first and second sets of races, and a plurality of rollers disposed in and around said spaces, each roller having one lengthwise part of one diameter and another lengthwise part of a different diameter whereby said parts respectively engage a first race and a second race, and means between each of the roller parts and each of the other first and second races to radially load the roller parts against the engaging first and second races and toward the other first and second races.

2. Mechanism according to claim 1, including a driving connection to one of said races, a driven connection to another of said races, and means to hold a third said race stationary.

3. Mechanism according to claim 1, wherein there is a separate radial loading means for said first inner and outer races and for said second inner and outer races.

4. Mechanism according to claim 3, wherein each said radial loading means comprises a series of elastic rings disposed between one said race and said rollers.

5. Mechanism according to claim 4, wherein said rings alternately are cammed toward the rollers and toward the race, and means to enforce said camming.

6. Mechanism according to claim 4, wherein said rings are triangular in cross-section and are alternately arranged with their base faces in roller contact and in race contact.

7. Mechanism according to claim 6, wherein means are provided to force said rings axially toward one another to cam the rings respectively inwardly and outwardly.

8. Mechanism according to claim 7, wherein said forcing means comprise resilient, adjustable units screwed upon portions of the related race member.

References Cited in the file of this patent

UNITED STATES PATENTS

| | | |
|---|---|---|
| 1,298,560 | Poppink | Mar. 25, 1919 |
| 1,665,165 | Gillett | Apr. 3, 1928 |
| 2,348,848 | Rabl | May 16, 1944 |
| 2,896,480 | Michie | July 28, 1959 |

FOREIGN PATENTS

| | | |
|---|---|---|
| 999,235 | France | Jan. 29, 1952 |